(12) United States Patent
Mund

(10) Patent No.: US 11,151,495 B2
(45) Date of Patent: Oct. 19, 2021

(54) METHOD AND SYSTEM FOR FACILITATING SHARED USE OF A SHARED USE FACILITY

(71) Applicant: Commissary Connect Innovations Inc., Vancouver (CA)

(72) Inventor: Sarb Mund, Vancouver (CA)

(73) Assignee: COMMISSARY CONNECT INNOVATIONS INC., Vancouver (CA)

( * ) Notice: Subject to any disclaimer, the term of this patent is extended or adjusted under 35 U.S.C. 154(b) by 134 days.

(21) Appl. No.: 16/473,375

(22) PCT Filed: Dec. 20, 2017

(86) PCT No.: PCT/CA2017/051565
§ 371 (c)(1),
(2) Date: Jun. 25, 2019

(87) PCT Pub. No.: WO2018/119515
PCT Pub. Date: Jul. 5, 2018

(65) Prior Publication Data
US 2020/0143305 A1 May 7, 2020

Related U.S. Application Data

(60) Provisional application No. 62/440,169, filed on Dec. 29, 2016.

(51) Int. Cl.
*G06Q 10/00* (2012.01)
*G06Q 10/06* (2012.01)

(52) U.S. Cl.
CPC .............................. *G06Q 10/06314* (2013.01)

(58) Field of Classification Search
CPC ............. G06Q 10/02; G06Q 10/06314; G06Q 10/06315; G06Q 10/08; G06Q 10/1095; G06Q 10/0645; G06Q 50/10
See application file for complete search history.

(56) References Cited

U.S. PATENT DOCUMENTS 5,875,430 A 2/1999 Koether
8,027,849 B2 * 9/2011 Johnson ............. G06Q 10/1095
705/2

(Continued)

FOREIGN PATENT DOCUMENTS

| CN | 103760844 B1 | 4/2014 |
| CN | 204515447 B1 | 7/2015 |
| CN | 204595527 B1 | 8/2015 |

OTHER PUBLICATIONS https://en.wikipedia.org/w/index.php?title=Building_automation &oldid=752540854 ; retrieved Jun. 7, 2020.

*Primary Examiner* — William S Brockington, III
(74) *Attorney, Agent, or Firm* — Cochran Freund & Young LLC; William W. Cochran

(57) ABSTRACT

There is described a method of facilitating shared use by multiple users of one or more shared use facilities. Each shared use facility comprises equipment for shared use by the multiple users. The method comprises: receiving at a control system an equipment use request from a particular one of the multiple users, the equipment use request identifying equipment desired for use ("identified equipment"); accessing by the control system an equipment reservation record identifying when equipment is reserved for use by one or more of the multiple users; validating by the control system the equipment use request based on the equipment reservation record and the equipment use request; transmitting, in response to validating the equipment use request, an activation instruction from the control system, wherein the activation instruction is for modifying an operating state of the identified equipment from a first operating state, in which the identified equipment is disabled for use, to a second operating state, in which the identified equipment is enabled for use.

25 Claims, 11 Drawing Sheets

(56) References Cited

U.S. PATENT DOCUMENTS

| | | | |
|---|---|---|---|
| 2003/0034873 A1 | 2/2003 | Chase et al. | |
| 2003/0097304 A1 | 5/2003 | Hunt | |
| 2004/0093516 A1 | 5/2004 | Hornbeck et al. | |
| 2004/0117528 A1 | 6/2004 | Beacher et al. | |
| 2004/0176969 A1 | 9/2004 | Fujinuma | |
| 2007/0200664 A1* | 8/2007 | Proska | G08G 1/205 340/5.42 |
| 2008/0010173 A1* | 1/2008 | Rendich | G06Q 10/02 705/28 |
| 2008/0109289 A1 | 5/2008 | Vivadelli et al. | |
| 2008/0281864 A1 | 11/2008 | Campbell | |
| 2010/0299172 A1* | 11/2010 | Nottoli | G06Q 10/06 705/7.18 |
| 2011/0141647 A1 | 6/2011 | Garcia et al. | |
| 2014/0278594 A1* | 9/2014 | Vivadelli | G06Q 10/02 705/5 |
| 2014/0351392 A1* | 11/2014 | Baker | G06Q 10/02 709/220 |
| 2016/0113438 A1 | 4/2016 | Hanson et al. | |
| 2018/0375868 A1* | 12/2018 | Ticas | A47G 27/0231 |

* cited by examiner

Sarb Mund
Soho Road

LOGOUT

| Oven 2 [In Use]<br>Company 1 | Oven 1 [In Use]<br>Company 1 |
|---|---|
| Burner 1 | Range Left |
| Oven 3 | Range Right |
| Oven 4 | Mixer [In Use]<br>Company 1 |
| Burner 2 | |

FIG. 8

FIG. 9A

METHOD AND SYSTEM FOR FACILITATING SHARED USE OF A SHARED USE FACILITY

FIELD

The present disclosure relates generally to the field of shared use facilities, and more specifically to systems and methods that facilitate shared use of such facilities.

BACKGROUND

Shared use facilities are facilities with equipment/infrastructure that is designed to be used by multiple users. One example of a shared use facility is a commercial kitchen with various equipment such as multiple freezers, ovens, etc. These various different appliances may be rented by different users for certain periods of pre-agreed time, and the users may be charged as a function of the rental period.

A challenge with current shared use facilities is that it is difficult to accommodate shared use of the facility infrastructure or equipment. Multiple users may wish to share the usage of the facility equipment. As a specific example, in a commercial kitchen, a number of different businesses and/or individuals may seek to use the shared commercial kitchen. However, there may be technical challenges related to usage/cost allocation, scheduling, and reservations, among others.

The present disclosure seeks to provide improved methods and systems for managing or facilitating shared use of a shared use facilities.

SUMMARY

In a first aspect of the disclosure, there is provided a method of facilitating shared use by multiple users of one or more shared use facilities. Each shared use facility comprises equipment for shared use by the multiple users. The method comprises receiving at a control system an equipment use request from a particular one of the multiple users, the equipment use request identifying equipment desired for use ("identified equipment"). The method further comprises accessing by the control system an equipment reservation record identifying when equipment is reserved for use by one or more of the multiple users. The method further comprises validating by the control system the equipment use request based on the equipment reservation record and the equipment use request. The method further comprises transmitting, in response to validating the equipment use request, an activation instruction from the control system. The activation instruction is for modifying an operating state of the identified equipment from a first operating state, in which the identified equipment is disabled for use, to a second operating state, in which the identified equipment is enabled for use.

The method may further comprise receiving at the control system an equipment reservation request from one or more of the multiple users. The equipment reservation request may identify equipment desired for use ("reserved equipment") by the one or more users and when the reserved equipment is desired for use. The method may further comprise updating by the control system the equipment reservation record based on the equipment reservation request.

The control system may comprise one or more equipment controllers. Each equipment controller may be communicatively coupled to a central control module and may be configured to control operating states of equipment associated with the equipment controller. Transmitting the activation instruction may comprise transmitting the activation instruction from the central control module to the equipment controller associated with the identified equipment. Transmitting the activation instruction may comprise transmitting the activation instruction from equipment controller associated with the identified equipment.

Validating the equipment use request may comprises accessing a user profile record comprising user identifiers each associated with a respective one of the multiple users. Validating the equipment use request may further comprise determining that a user identifier inputted by the particular user corresponds to the user identifier associated with the particular user in the user profile record. Validating the equipment use request may further comprise determining that the identified equipment is not reserved for use at the time the control system receives the equipment use request. Validating the equipment use request may further comprise determining that the identified equipment is reserved for use by the particular user at the time the control system receives the equipment use request.

The activation instruction may further be for modifying the operating state of the identified equipment by controlling one or more relays associated with the identified equipment. The one or more relays may comprise one or more solenoids.

The method may further comprise recording by the control system equipment usage data during use of equipment. The equipment usage data may comprise one or more of: energy consumption by the equipment during use of the equipment; and usage characteristics of the equipment.

The method may further comprise comparing, by the control system, a duration of time during which equipment is in its first operating state to a period of time during which the equipment is reserved for use by one of the multiple users, based on the equipment reservation record.

The method may further comprise determining by the control system, based on the equipment reservation record, that the equipment reservation request is no longer valid. The method may further comprise transmitting, in response to determining that the equipment reservation request is no longer valid, a deactivation instruction from the control module. The deactivation instruction may be for modifying the operating state of the reserved equipment from the second operating state to the first operating state.

The method may further comprise, prior to or in response to receiving the equipment reservation request, transmitting by the control system an instruction to activate a camera.

The method may further comprise, prior to receiving the equipment reservation request, receiving at the control system login input from the particular user. The method may further comprise validating by the control system the login input.

The method may further comprise recording by the control system a total amount of time that equipment is in use. The method may further comprise, in response to determining that the total amount of time is equal to a predetermined amount of time, transmitting by the control system an alert for alerting a system administrator that maintenance of the equipment is required.

The method may further comprise determining by the control system that a contract with one of the users has expired. The method may further comprise, in response to determining that the contract has expired, updating by the control system the equipment reservation record by removing any existing reservations made by the user whose contract has expired.

The method may further comprise transmitting from the control system one or more firmware updates to the equipment or to the one or more equipment controllers.

The method may further comprise receiving at the control system sensor data from one or more sensors associated with the identified equipment. The method may further comprise transmitting by the control system one or messages to a remote user device based on the sensor data. The one or more sensors may comprise one or more temperature sensors.

In a further aspect of the disclosure, there is provided a system for facilitating shared use by multiple users of one or more shared use facilities. Each shared use facility comprises equipment for shared use by the multiple users. The system comprises a control system configured to receive an equipment use request from a particular one of the multiple users, the equipment use request identifying equipment desired for use ("identified equipment"). The control system is further configured to access an equipment reservation record identifying when equipment is reserved for use by one or more of the multiple users. The control system is further configured to validate the equipment use request based on the equipment reservation record and the equipment use request. The control system is further configured to transmit, in response to validating the equipment use request, an activation instruction for modifying an operating state of the identified equipment from a first operating state, in which the identified equipment is disabled for use, to a second operating state, in which the identified equipment is enabled for use.

The control system may be further configured to perform any of the functions according to any of the above-described methods.

In a further aspect of the disclosure, there is provided a computer-readable medium having computer program code stored thereon and configured when read by a processor to cause the processor to perform a method. The method comprises receiving an equipment use request from a particular one of the multiple users, the equipment use request identifying equipment desired for use ("identified equipment"). The method further comprises accessing an equipment reservation record identifying when equipment is reserved for use by one or more of the multiple users. The method further comprises validating the equipment use request based on the equipment reservation record and the equipment use request. The method further comprises transmitting, in response to validating the equipment use request, an activation instruction for modifying an operating state of the identified equipment from a first operating state, in which the identified equipment is disabled for use, to a second operating state, in which the identified equipment is enabled for use.

The method implemented by the computer-readable medium may further comprise any features of the above-described methods.

DESCRIPTION OF THE FIGURES

There will now be described embodiments of the disclosure, in conjunction with the accompanying drawings of which:

FIG. 8 shows a menu for activating equipment via an equipment controller, in accordance with an embodiment of the disclosure;

FIGS. 9A and 9B show an equipment reservation record, in accordance with an embodiment of the disclosure.

DETAILED DESCRIPTION

Figure 1:
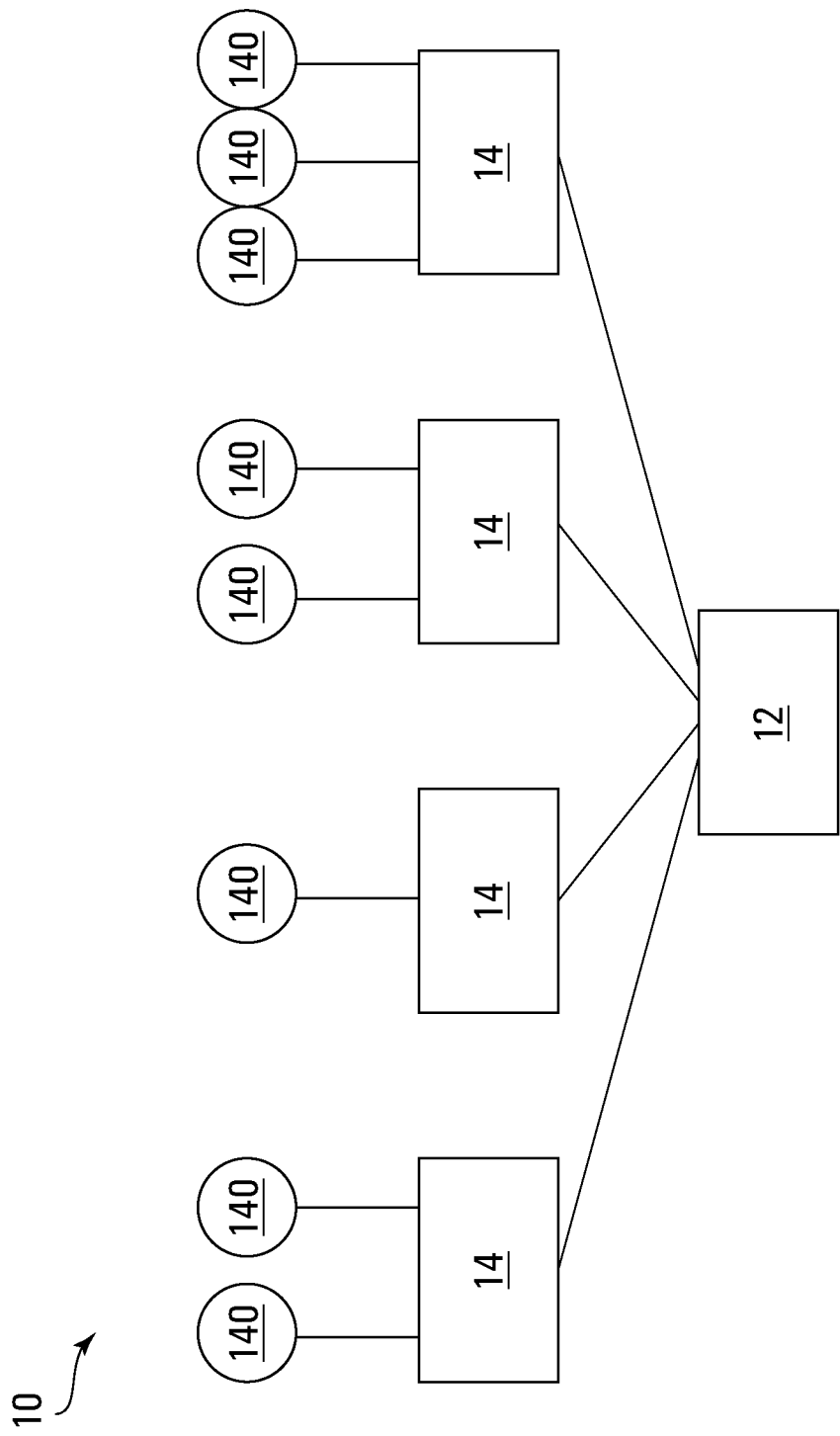
FIG. 1 is a schematic diagram of a control system in accordance with an embodiment of the disclosure.

The present disclosure seeks to provide methods and systems for facilitating shared use of a shared use facility. While various embodiments of the disclosure are described below, the disclosure is not limited to these embodiments, and variations of these embodiments may well fall within the scope of the disclosure which is to be limited only by the appended claims.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit", "module" or "system". Furthermore, the various example embodiments may take the form of a computer program product on a computer-usable storage medium having computer-usable program code embodied in the medium.

Any suitable computer-usable or computer readable medium may be used. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or entirely on the remote computer or server. In the latter scenario, the remote computer may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

For the purposes of the following disclosure, a shared use facility may comprise any facility intended or designed to be used by multiple users. For example, a shared use facility may comprise a shared use kitchen such as a commercial kitchen, a shared use laboratory, a shared use laundromat, etc. Shared use equipment within a shared use facility, which may simply be referred to as "equipment", may be any device, piece of equipment, resource, apparatus, or other appliance which is intended or designed for use by multiple users.

In embodiments, a shared use commercial kitchen facility and equipment billing and scheduling network is provided. The shared use commercial kitchen equipment billing and scheduling network is a computer-based system that is configured to control equipment in a shared commercial kitchen. Embedded firmware, software and/or hardware systems are operable to enable sharing of equipment between multiple users at a one or more shared use facilities.

In embodiments, the methods and systems described herein enable scheduling of equipment usage, tracking of actual equipment usage, calculating of costs and generating of invoices for customers. As described above, while some of the embodiments are configured for sharing appliances in a commercial kitchen, the methods and systems described herein could be applied to other environments where there is a need to share equipment and where access to that equipment can be controlled electronically.

An example of a control system that may be implemented in a shared use facility is shown in FIG. 1. FIG. 1 shows a control system 10 comprising a central control module 12 communicatively coupled to multiple equipment controllers 14. Each equipment controller 14 is operable to control operating states of kitchen equipment 140 associated with equipment controller 14. In some cases, an equipment controller 14 may be operably associated with a single piece of equipment 140, whereas in other cases an equipment controller 14 may be operably associated with multiple pieces of equipment 140. An embodiment of equipment controller 14 will now be described in further detail, with reference to FIG. 2.

Equipment controller 14 may be comprised of a minicomputer board configured to process instructions that may be provided as a software package operable to control equipment 140. The minicomputer may be connected to peripherals that display information, allow user input via a touch screen, and provide low-voltage control interface for the various types of equipment 140 controlled by equipment controller 14. Equipment controller 14 may be operatively coupled to an onboard camera configured to capture an image of a person standing in front of equipment controller 14. The components may be housed in an industrial-style lockable enclosure that is adapted to withstand moisture and other airborne contaminants typically found in an industrial kitchen environment. Power to operate the computer and peripherals may supplied via an external CSA/UL-approved low-voltage power supply.

Figure 2:
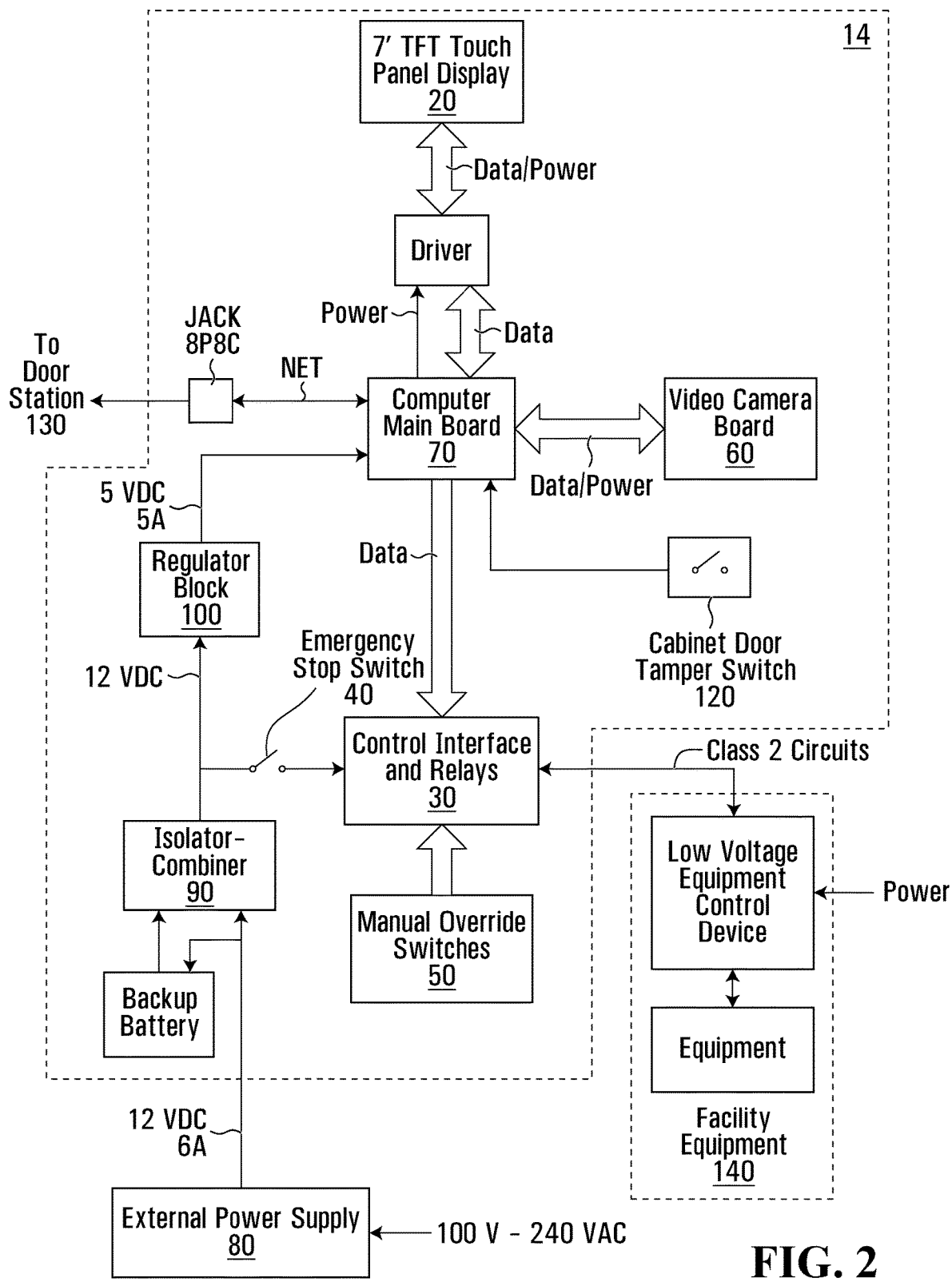
FIG. 2 is a sample block diagram showing elements of an equipment controller, in accordance with an embodiment of the disclosure.

FIG. 2 is a sample block diagram showing elements of equipment controller 14 and how they are interconnected.

A touch panel display 20 is mounted to the outside of the enclosure of equipment controller 14 and provides a graphical user interface for receiving input from a user. For example, users may enter a passcode via touch panel display 20 and subsequently may initiate activation of one or more appliances (e.g. equipment 140) via touch panel display 20.

Touch panel display 20 includes a companion driver board 22. Driver board 22 acts as an interface between a computer main board 24 and touch panel display 20, and includes circuitry adapted to supply power to and operate touch panel display 20.

A control interface 26 is maintained inside the enclosure and acts as a means by which equipment controller 14 controls a number of different appliances/equipment 140 in the kitchen. A corresponding number of on-board relays 30 are connected to detachable terminal blocks to facilitate wiring of equipment controller 14 to external equipment control points. Each control point is isolated from all other the control points. Each relay 30 may, for example, have a rating of AC 250 Volts at 10 Amps/DC 30 Volts at 12 Amps. Each relay 30 acts as a switch to turn externally supplied current on or off to each controlled equipment 140.

The current from control interface 26 to equipment 140 should preferably be low-voltage AC or DC (referred to as a class 2 circuit), not 120/240 volts AC. Control interface 26 itself does not supply any power to equipment 140. Signals from computer main board 24 control relays 30 and therefore which appliances are off or on. LED indicators on control interface 26 indicate which of the relays are on at any time.

Equipment controller 14 further includes an emergency stop 40. Activating emergency stop 40 interrupts power to control interface 26 and immediately turns off all equipment 140 in the kitchen.

Equipment controller 14 further includes manual override switches 50. A bank of toggle switches is provided inside the enclosure to manually switch power on and off to each equipment 140. Manual override switches 50 are wired in parallel with relays 30 and can therefore activate each equipment 140 directly. Manual override switches 50 facilitate turning on each equipment 140 manually without having to use control interface 26. This may facilitate testing of equipment 140 during installation, for example, to ensure that equipment 140 works correctly. Furthermore, in the event that equipment controller 14 malfunctions, power may still be provided to equipment 140 by activating the appropriate manual override 50.

As mentioned above, a camera 60 (a high-resolution video camera, for example) may be mounted behind an opening in the enclosure to provide an image of the person standing in front of equipment controller 14, or a general image of whatever else is in view of equipment controller 14. A user of control system 10 with proper authorization may remotely log into control system 10 and see whatever camera 60 records.

A power supply 80 (e.g. a single 12 volt DC external power module) is provided that supplies the current necessary for equipment controller 14. Power supply 80 may, in some embodiments, be adapted to charge an internal lithium-ion backup battery. In the event equipment controller 14 loses AC power, the battery is designed to keep all of the electronics running for a period of time.

An isolator-combiner 90 performs the function of an uninterruptable power supply and prevents power supply 80 and the battery from powering equipment controller 14 at the same time. When the main power supply is active, the battery output is disconnected, but when power is interrupted isolator-combiner 90 automatically supplies battery power to equipment controller 14 with no interruption.

A regulator block 100 is configured to convert power from power supply 80/the battery to power required by computer main board 70 (e.g. 5 volts), touch panel display 20, and/or video camera 60.

Some or all of the components with the exception of power supply 80 may be located inside of an industrial-type electrical enclosure with a hinged lid. Knockouts on the top, bottom and/or sides of the enclosure may provide the means by which the control wiring to equipment 140 enters the enclosure. The front door may have a key lock to prevent unauthorized access to the interior, and a tamper switch 120 is configured to alert computer main board 70 whenever the door is opened for any reason.

If the door to equipment controller 14 is opened then equipment controller 14 will record the occurrence and take a picture. The data will be stored locally as well as transferred to the central control module 12.

The shared use kitchen may include one or more remote door stations 130, external to equipment controller 14, and connected to equipment controller 14 via an 8P8C Ethernet port to provide access to the kitchen to authorized users only. Access to the shared used facility may be recorded by an equipment controller 14. In some embodiments, each access to the facility may be recorded and stored on central control module 12. Unlocking of the remote door stations 130 may be managed from equipment controllers 14 and/or central control module 12.

Figure 4:
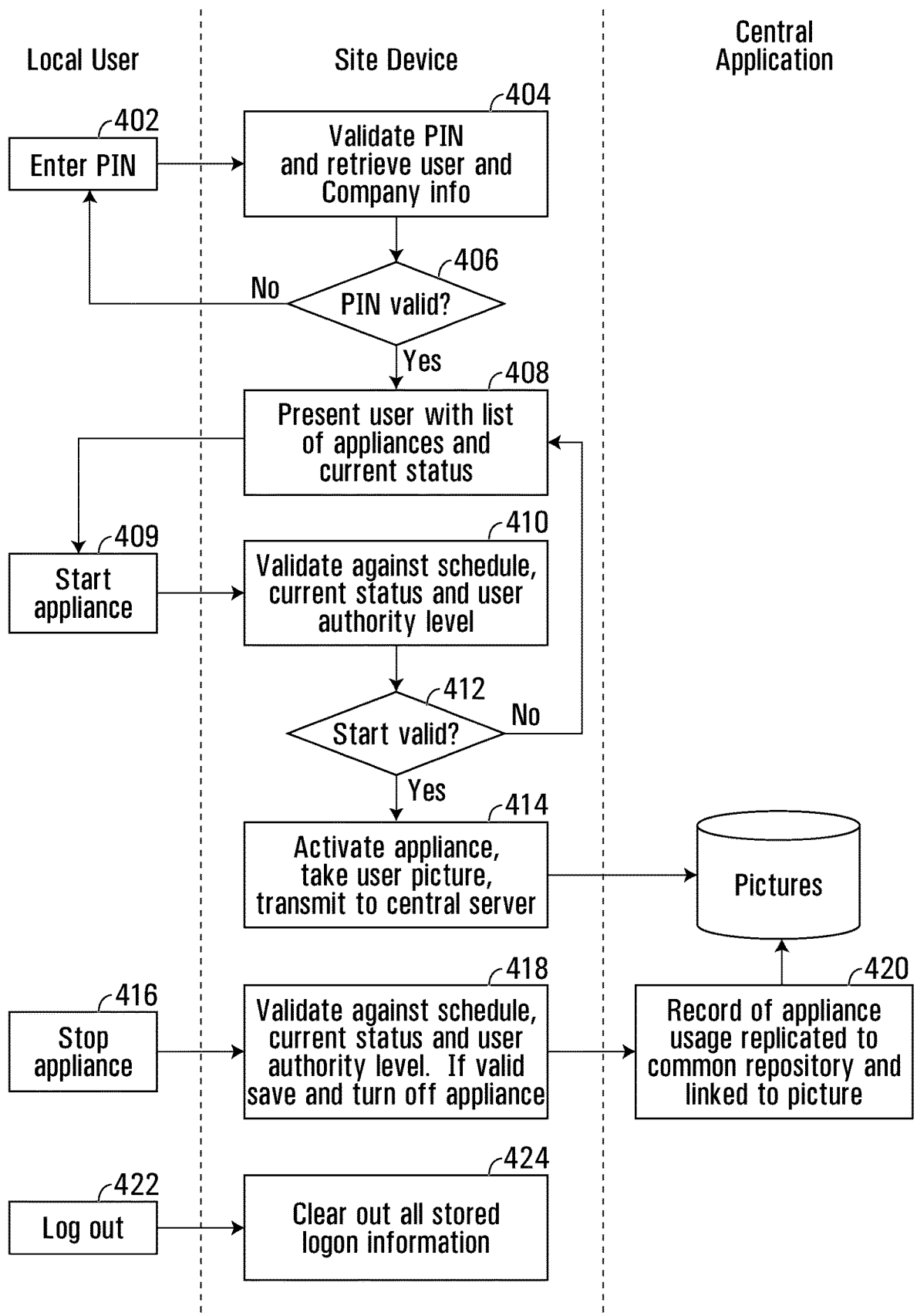
FIG. 4 is a flowchart showing a method of facilitating shared use of a shared use facility, in accordance with an embodiment of the disclosure.
Figure 5:
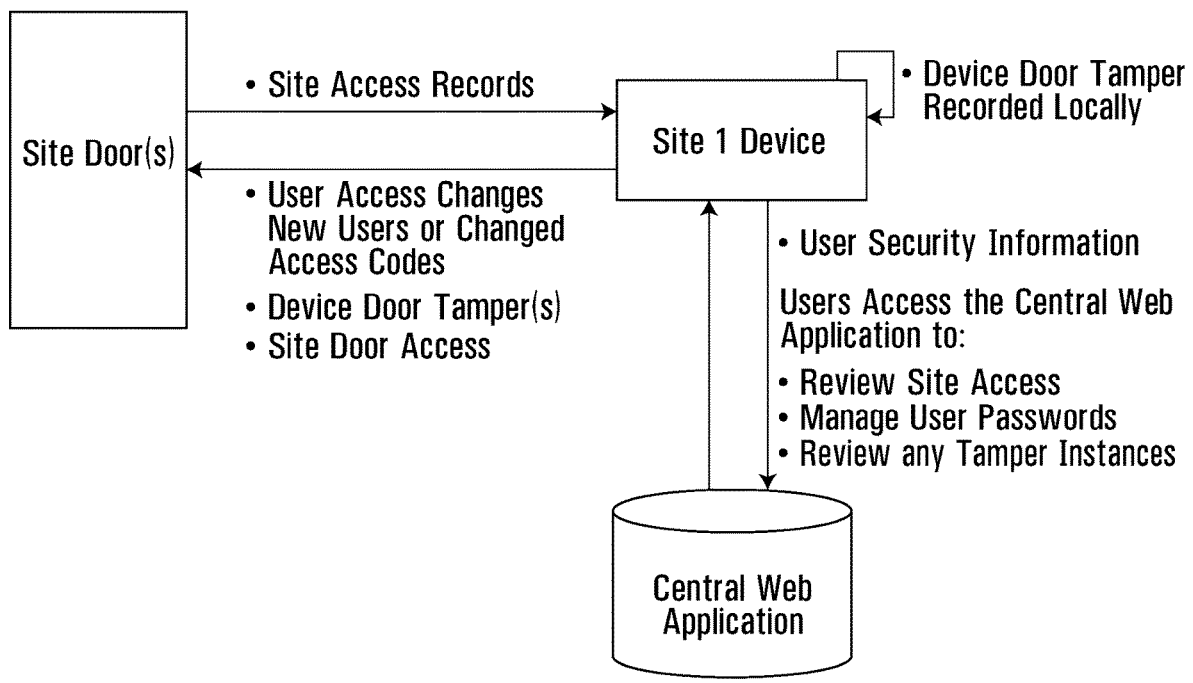
FIG. 5 is a diagram illustrating security features including tamper detection and door access, in accordance with an embodiment of the disclosure.

Turning to FIG. 4, there will now be described a method of facilitating shared use of a shared use facility, in accordance with an embodiment of the disclosure. At block 402, a user may access equipment controller 14 via touch panel display 20, by entering a user-specific identification code such as a PIN code. At block 404, equipment controller 14 then validates the user PIN. For example, equipment controller 14 may access a user profile record comprising user identifiers each associated with a respective one of the multiple users. The user profile records may be stored locally on equipment controller 14, or alternatively may be stored remotely on central control module 12, in which case equipment controller 14 communicates with control module 12 in order to access the user profile record. In some embodiments, the user profile record may be stored on a cloud-based store or other remote server, in which case control module 12/equipment controller 14 retrieves the user profile record from such a location. Equipment controller 14 then determines that the user identifier (e.g. PIN) inputted by the particular user corresponds to the user identifier associated with the particular user in the user profile record. In other words, equipment controller 14 verifies that the user is a subscriber of the service provided by control system 12. At block 406, equipment controller 14 validates the user PIN once the user PIN is identified in the user profile record. Alternatively, if the user PIN is not found within the user profile record, then the user is informed via touch panel display 20 and further access is denied.

At block 408, equipment controller 14 presents the user with a number of appliances/equipment controlled by equipment controller 14, as well as their current status. An example of this display is shown in FIG. 8. For example, according to FIG. 8 it can be seen that Oven 2 is currently in use, whereas Burner 1 is not indicated as in use and is therefore available for use.

At block 409, equipment controller 14 receives an equipment use request from the user. The equipment use request identifies an appliance that the user wishes to use. For example, the user may select Burner 1 from the screen in FIG. 8. After receiving the equipment use request, at blocks 410 and 412 equipment controller 14 determines whether or not the identified equipment is currently reserved for use. In order to do this, equipment controller 14 accesses an equipment reservation record. The equipment reservation record may be stored locally on equipment controller 14, or alternatively may be stored remotely on central control module 12, in which case equipment controller 14 communicates with control module 12 in order to access the equipment reservation record. In some embodiments, the equipment reservation record may be stored on a cloud-based store or other remote server, in which case control module 12/equipment controller 14 retrieves the user profile record from such a location.

Figure 9A:
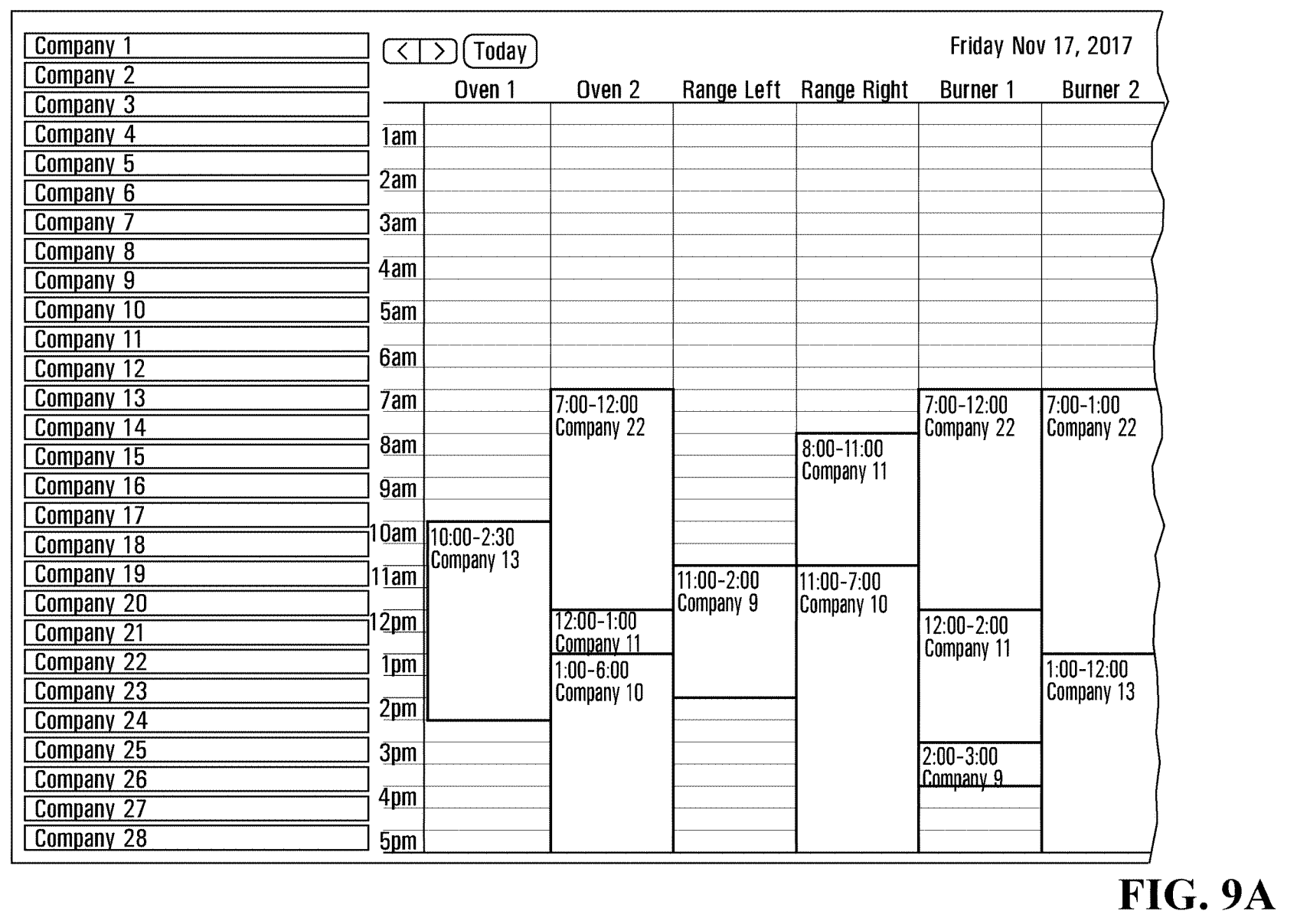
Figure 9B:
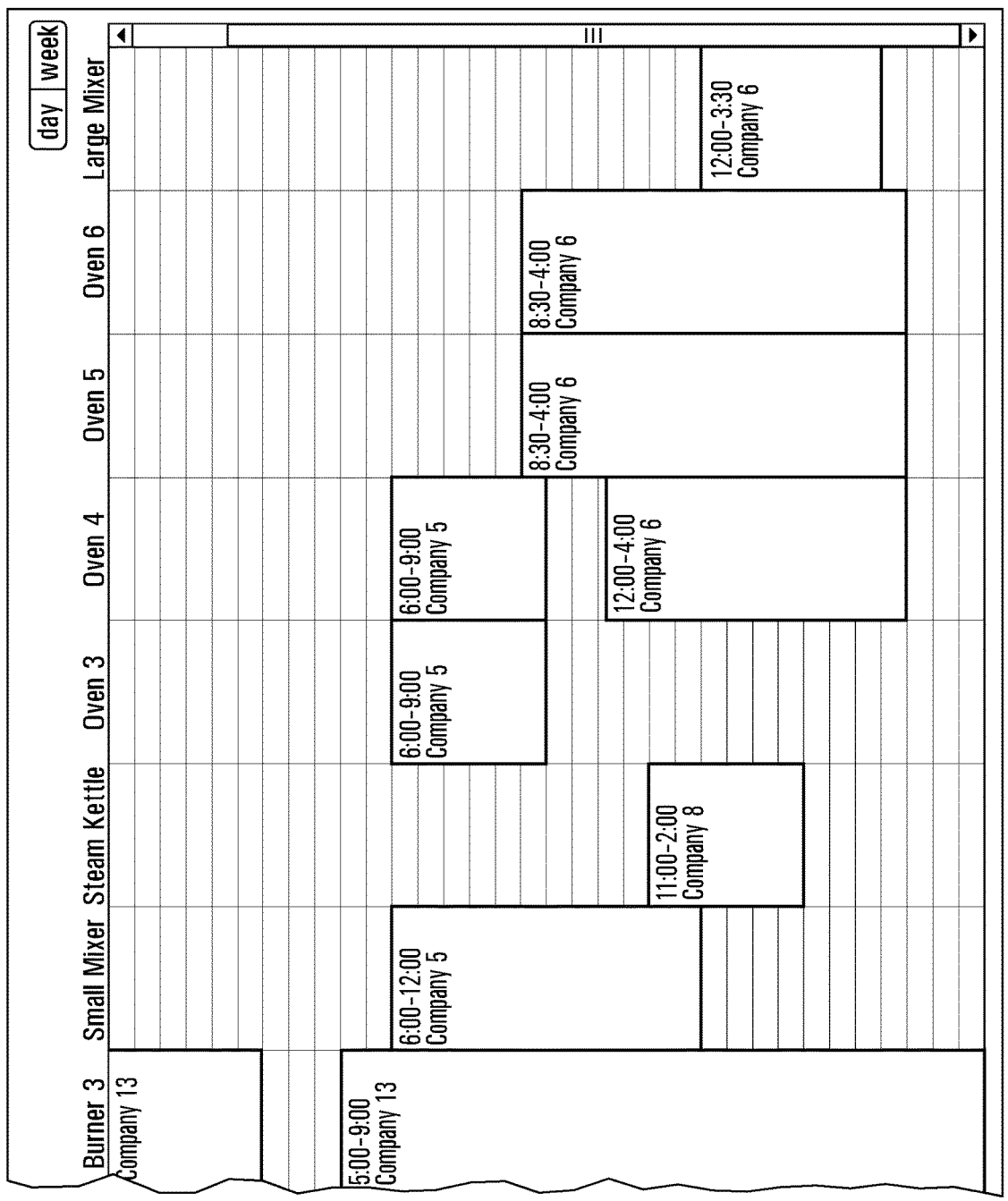

The equipment reservation record is an electronic record identifying when different equipment is reserved for use, and by whom. An example of the equipment reservation record is shown in FIGS. 9A and 9B, which show different equipment reserved for use at different times and on different days by different customers.

Once equipment reservation record is accessed, equipment controller 14 determines whether the equipment identified in the equipment use request is not reserved for use at the time equipment controller 14 receives the equipment use request. If the identified equipment is available for use, then equipment controller 14 activates the corresponding relay which triggers equipment 140 to transition to an activated state. In its activated state, equipment 140 may be used as per normal by the user. Furthermore, equipment controller 14 begins to record usage data including the start time at which equipment 140 was activated, for subsequent billing purposes.

If equipment controller 14 determines that equipment 140 is currently reserved, then equipment controller 14 determines whether the current reservation is in respect of the particular user requesting access to equipment 140. If, based on the equipment reservation request and the user PIN, equipment controller 14 determines that the current user is the same user who has reserved equipment 140, then at blocks 412 and 414 equipment controller 14 activates the corresponding relay which triggers equipment 140 to transition to an activated state. If however equipment controller 14 determines that another user has reserved equipment 140 for use, then equipment controller 14 informs the current user via touch panel display 20 and denies access to equipment 140. Thus, the corresponding relay is not activated and use of equipment 140 is prevented. In addition to enabling use of equipment 140, at block 414 equipment controller 14 captures an image of the user using camera 60, and transmits the image to control module 12.

When the user no longer wishes to use equipment 140, at block 416 equipment controller 14 receives from the user a stop equipment use request. As with the equipment use request, at block 418 equipment controller 14 verifies the stop equipment use request by checking the user's PIN against the user profile record. Note that the user may be requested to re-renter their PIN in order to effect a stop equipment use request. Assuming that the stop equipment use request is validated, equipment controller 14 triggers the corresponding relay which triggers equipment 140 to transition to a deactivated state. Equipment controller 14 logs the time at which equipment 140 was deactivated, and the total usage time of equipment 140 may be transmitted to control module 12 for billing purposes (block 420). At blocks 422 and 424, the user may log out of equipment controller 14 which may erase all stored logon information.

Control system 10 may be configured in the following further ways. For example, the equipment reservation record may be modified by receiving at central control module 12 an equipment reservation request from one or more of the multiple users of control system 10. For example, a user may request reservation of one or more appliances/equipment, by transmitting an equipment reservation request to control module 12 (for example via a mobile device). Control system 10 then updates the equipment reservation record based on the equipment reservation request. In other embodiments, the equipment reservation request may be sent to equipment controller 14 instead of control module 12.

During use of equipment, equipment controller 14 may record usage data of equipment 140. For example, in addition to recording the amount of time that equipment 140 is in its activated state, equipment controller 14 may further record various other usage characteristics, such as a temperature of equipment 140, or the total energy consumption of equipment 140. Various sensors may be used to monitor such data, and equipment controller 14 may be configured to receive such data either passively from the sensors, or else actively by querying the sensors for their readings. Sensor data may be transmitted from control system 10 to a remote device such as a remote user device. Thus, a user may remotely monitor equipment 140. In some embodiments, it may be possible for the user to remotely control equipment 140, by communicating with control system 10.

Equipment controller 14 may be configured to compare an amount of time that equipment 140 was in its activated state to an amount of time that equipment 140 was reserved by the user. Furthermore, equipment controller 14 may be configured to record a total amount of time that equipment 140 was in use, among all users. Equipment controller 14 may determine that the total amount of time has exceeded a preset amount of time (for example a period of time after which maintenance of equipment 140 is required). Upon detecting that the total amount of time has exceeded a preset amount of time, equipment controller 14 may transmit a message to control module 12. The message may alert a system administrator that maintenance of appliance 140 is required.

Control module 12 may be further configured to determine that a contract with one of the users has expired. Upon doing so, control module 12 may automatically update the equipment reservation record by removing any existing reservations made by the user whose contract has expired. Control module 12 may further update stored facility entry permissions such that the users whose contract has expired may no longer be permitted access to the facility via door stations 130.

Control module 12 may be further configured to transmit one or more firmware updates to equipment controller 14. Equipment controller 14 may execute the firmware updates which may be designed to update software on equipment controller 14, or software on equipment 140. In the latter case, equipment controller 14 may be configured to communicate with equipment 140 and transmit the software update to equipment 140.

The following description relates to features of control system 10 that may be implemented in shared use facilities.

Equipment controller 14 may be configured to have the following functional capabilities:

Communicate changes in appliance status to control module 12; and

Receive changes in control information from control module 12 (e.g. companies, users, schedules, equipment, etc.).

Equipment controller 14 may be physically connected to one or more pieces of equipment, and/or may be network enabled and/or capable of communicating with control module 12.

Figure 10:
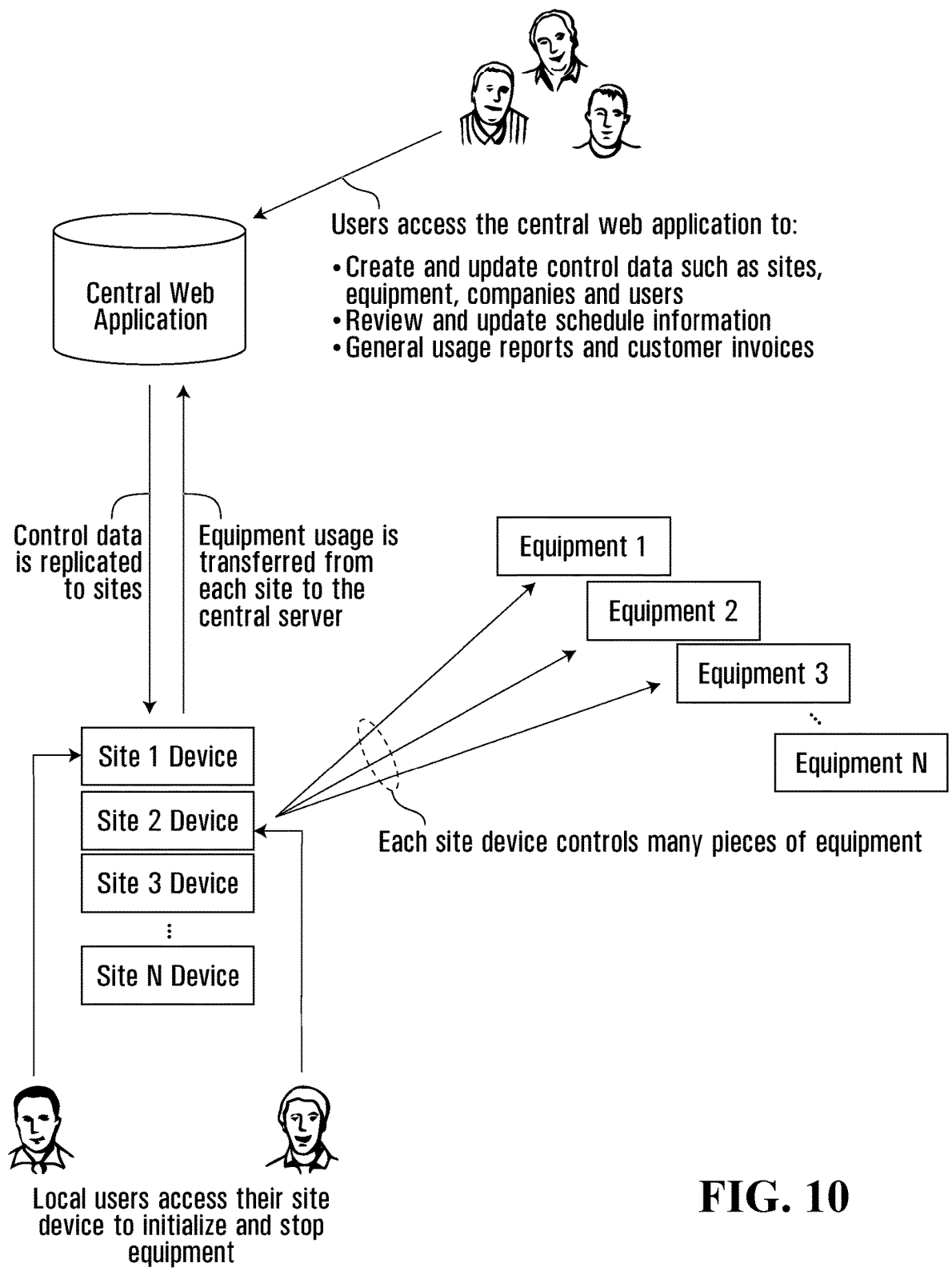
FIG. 10 shows a central server application interfacing with a control system, in accordance with an embodiment of the disclosure.

A central server application may be provided as illustrated in FIG. 10, wherein functionality of the central server application includes:

Scheduling of equipment at each facility;

Reviewing past usage of equipment by facility, company and use;

Maintenance of control information such as users, facilities, companies, rates, etc.; and Generation of invoices for actual equipment usage.

Figure 3:
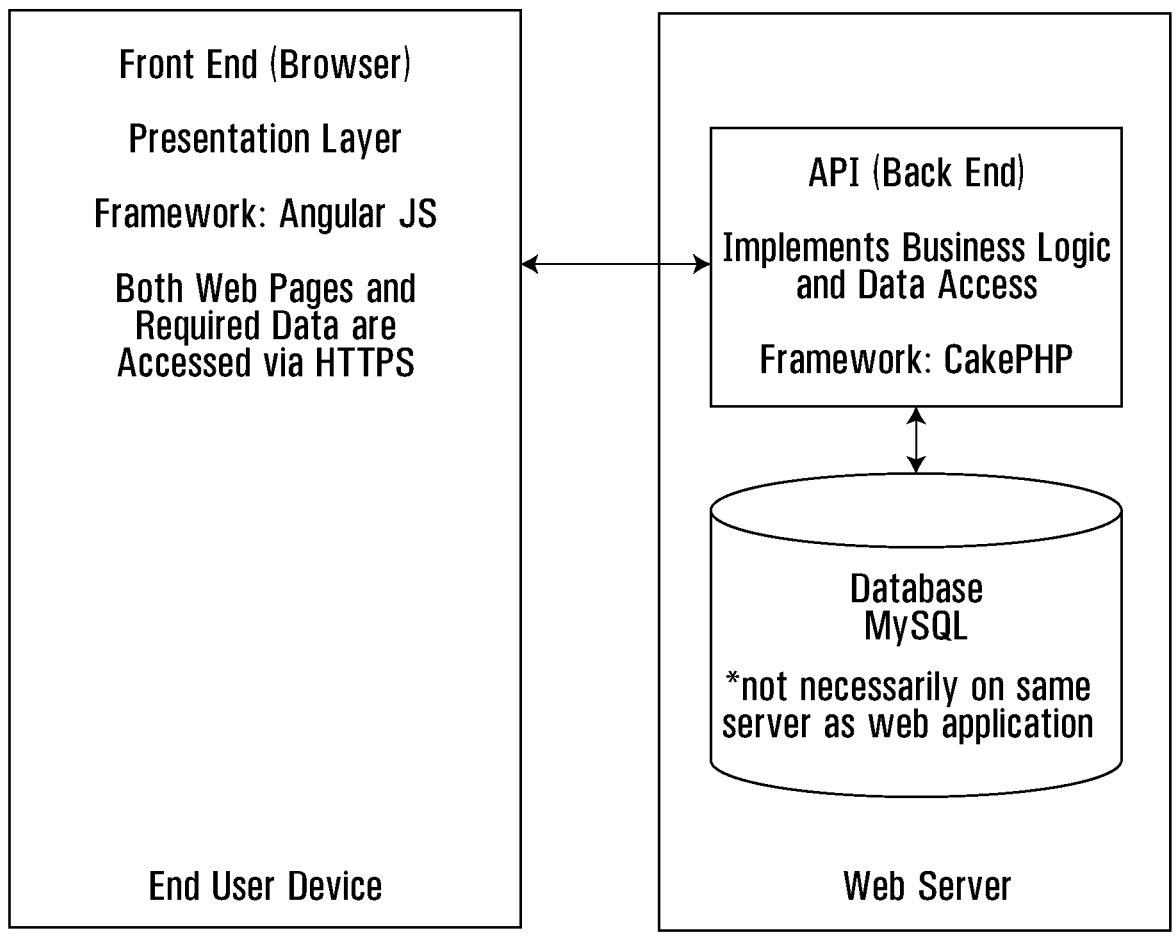
FIG. 3 illustrates an architecture of software components, according to an embodiment of the disclosure.

In terms of software architecture, the server application may be divided into two components. The first component is an API module which contains the business logic and performs all data access and updates. The second component is a presentation unit which is user-facing and interacts with the API. This design allows for alternative presentation layers (i.e. mobile or desktop) to be developed in the future if the need should arise. A possible layout of the software components is shown in FIG. 3.

Both API implementations are RESTful (Representational State Transfer) in that they are stateless and all requests are made via a Universal Resource Identifier (URI). Data transfer between the presentation and API layers may be in JSON (JavaScript Object Notation) although other formats such as XML can be supported.

Both sets of components make use of frameworks. Frameworks can supply significant efficiencies and reduce testing time. Frameworks also tend to promote conventions that further improve consistency and efficiency. The main frameworks that may be used are:

CakePHP™: Used for the two API components installed on the web servers. CakePHP is PHP-based and the framework is able to generate controllers, views and test case stubs from a database model. CakePHP also defines the relationship between URI addresses and the appropriate controllers and views (routing).

Angular JS™: This framework is a JavaScript extension and is the basis for the front end code of both components. Angular JS™ reduces the amount of custom JavaScript that must be written for the front-end and extends HTML to better support web applications. It also supplies many useful front-end tools such as form validation.

There may be a separation of concerns throughout the design of the application. Business logic may be encapsulated in controller units, and presentation logic may be defined in view units.

Application security may be implemented via JSON Web Tokens. The JWT mechanism has a number of advantages including:

The token contains meta-data such as user name, authority and validity time-frame; and There is no transmission of credentials in plain text.

On the equipment controllers 14, tokens may be obtained via the user entering a 5-digit pin code. The pin code may be used to obtain associated user ID and company information. The pin code may be specific to the equipment controller 14. Once successfully logged in, the user may be able to start and stop facility equipment.

On the central server application, an e-mail address and password may be required. The password may be hashed and not stored in readable format. Tokens may be stored in memory and may be available until the user logs out, or may expire after a set, configurable period of time.

Access to functionality in the central web application may be dependent on the role assigned to the user. For example, the roles may be hierarchical with a user at a certain level having all the rights of users at lower levels. The roles may include the following three levels:

User
    Able to review data for their own company such as equipment usage
    Able to examine the equipment reservation record
    Able to make changes to personal information for their company Site/Kitchen Administrator
    Able to access all functionality for one or more equipment controllers 14

System Administrator
    Able to access all functionality for all equipment controllers 14
    Able to create and maintain equipment controllers 14

Functionality available in the central web application may be dependent on the user's authority level. The following table summarizes some available functionality in the main application. The functions are presented through a menu which is generated upon login based on the user's authority level.

Note that functions where the role administrator is indicated are available to facility administrators on only their assigned facilities. System administrators are able to administer various facilities.

| Function | Description | Role |
| --- | --- | --- |
| Logon | A simple logon screen will prompt the user for their user ID and password. Logging on successfully will generate a token that can be passed to the server on all subsequent transactions. Users will have an option of changing their password via a Forgotten Password link which will generate an email. After logon the schedule screen is presented as a starting point. | User |
| Schedule | Displays the schedule for the current day and selected kitchen. The user has the ability to navigate to different days and kitchens. Equipment is sorted into columns based on an entry in the weight column they have been given. The administrator can make changes to the equipment reservation record and such changes will be refreshed to the corresponding equipment controllers 14 periodically. Company users are able to request additions/changes to the equipment reservation record. These can be made in the available areas and can be approved by the kitchen administrator. | User |
| Add | New reservations can be added by dragging a company onto the schedule at an appropriate location (day, time and equipment). | Admin |
| Update | Reservations can be re-sized as required to extend the time. An existing reservation can be dragged to a separate piece of equipment. | Admin |

-continued

| Function | Description | Role |
| --- | --- | --- |
| Delete | Clicking on a reservation gives the user the option of deleting it. | Admin |
| Usage History | This menu provides methods of viewing actual usage history. The original source of this data will be the remote equipment controller 14. Some caveats to the usage information include: Usages of less than 5 minutes are not included. Usages are rounded to the nearest 15 minutes. The sub-views described below are available. | User |
| List | List the actual usages in detail. Filters can be applied for month, equipment, company, kitchen, and equipment group. Summaries of equipment usage are displayed based on the equipment group. | Admin User |
| Graphical | Shows a graphical view of the usage over a set number of weeks. The user can filter for kitchen and number of weeks. The display then shows graphically usage by equipment for a single day of the week. | User |
| Cost Report | Report on the usage costs for a month for a selected company. Users can access reports for their own company. Admin users are able to report on all companies. | User Admin |
| Late/Early Start Report | This is a report that shows usages that represent an early start and/or a late completion on a reservation. | Admin |
| Equipment | A list of equipment by facility can be viewed by the Admin users. The list will indicate whether or not the equipment is running. From the equipment list the following functionality is available. | |
| New | Add a new piece of equipment. | Admin |
| View Usage | View usage of that specific equipment. This links to the Usage History view with the equipment being pre-set. | Admin |
| Edit | Gives the ability to change equipment attributes such as Name, Description, Weight (for sorting), or assigned I/O PIN. Equipment will be assigned to a group/class (i.e. Oven, Burner) which assists in reporting and logically grouping displays. The current rate for the equipment is displayed. This can be overridden at the user level. | Admin |
| Stop | Remotely stop an active piece of equipment. | |
| Tenants | Lists all users for a facility and their associated companies | Admin |
| New | Add a new tenant | Admin |
| Edit | Edit the selected tenant. | Admin |
| Companies | A listing of the various companies/customers that use the application. Most users are associated with a company. Attributes associated with a company include: Name Preferred color for display in charts Address and contact information Add base rent | Admin |
| Add | Add a new company | Admin |
| Edit | Update fields related to a company (address, owner, contact info, etc.) | Admin |
| Applications | A simple list of the applications/leads can be displayed. | Admin |
| Users | Lists all users and their associated companies | Admin |
| New | Add a new user | Admin |
| Edit | Edit the selected user. This will include being able to edit passwords and access codes. | Admin |
| Equipment Rates | A list of equipment rates (cost/time) with effective dates is displayed. | Admin |
| Add | Add a new rate for the equipment | Admin |
| Edit | Edit the rate for a piece of equipment. Controls prevent editing of past rates that have already been used in billings. | Admin |
| Billing | Generate a monthly bill based on rent and a mix of semi-fixed cost items such as rent, freezer space, etc. | Admin |
| Edit | Allow for the application of discount rates/adjustments at the bill level. | Admin |
| Lock | The bill for customers can be locked at a certain point and further adjustments are prevented from being made. | Admin |
| Semi-Fixed Items and Rates | Breaks down the "rent" into semi-fixed components such as space usage, freezer usage, dry goods space, etc. This includes functions to: Add/Edit the list of semi-fixed items and their rates Apply that list to each customer with appropriate units as well as rates. (i.e. 1.75 Standard Cooling Rack Space * $200/Std -> $375) | Admin |
| Sites/Kitchens | List the available facilities and allow for the categorization into areas. | Admin |

-continued

| Function | Description | Role |
|---|---|---|
| Add | Add a kitchen/facility | System Admin |
| Edit | Edit a kitchen/facility | System Admin |
| Security | View Site Access<br>View Equipment Starts - including pictures<br>View Tamper Incidents - including pictures | System Admin |

The use of the CakePHP™ and AngularJS™ frameworks aid the design of the functions in the central web application from a consistency perspective.

Figure 6:
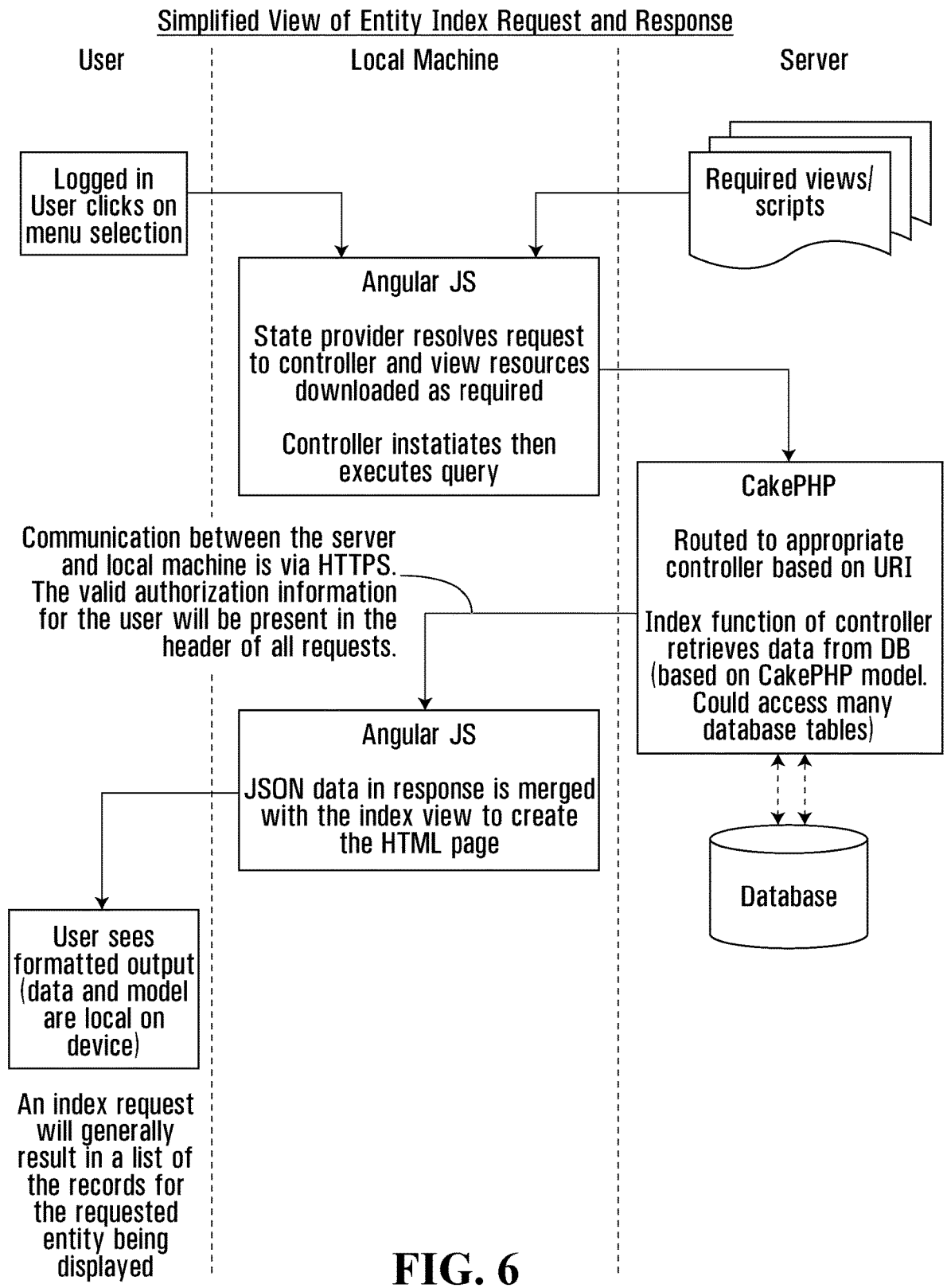
FIG. 6 is a diagram illustrating an example sequence of calls that take place on a call to an index function for an entity, in accordance with an embodiment of the disclosure.

FIG. 6 shows the sequence of calls that take place on a call to an index function for an entity. An example of a list would be the list of equipment that appears when the equipment menu item is clicked.

Figure 7:
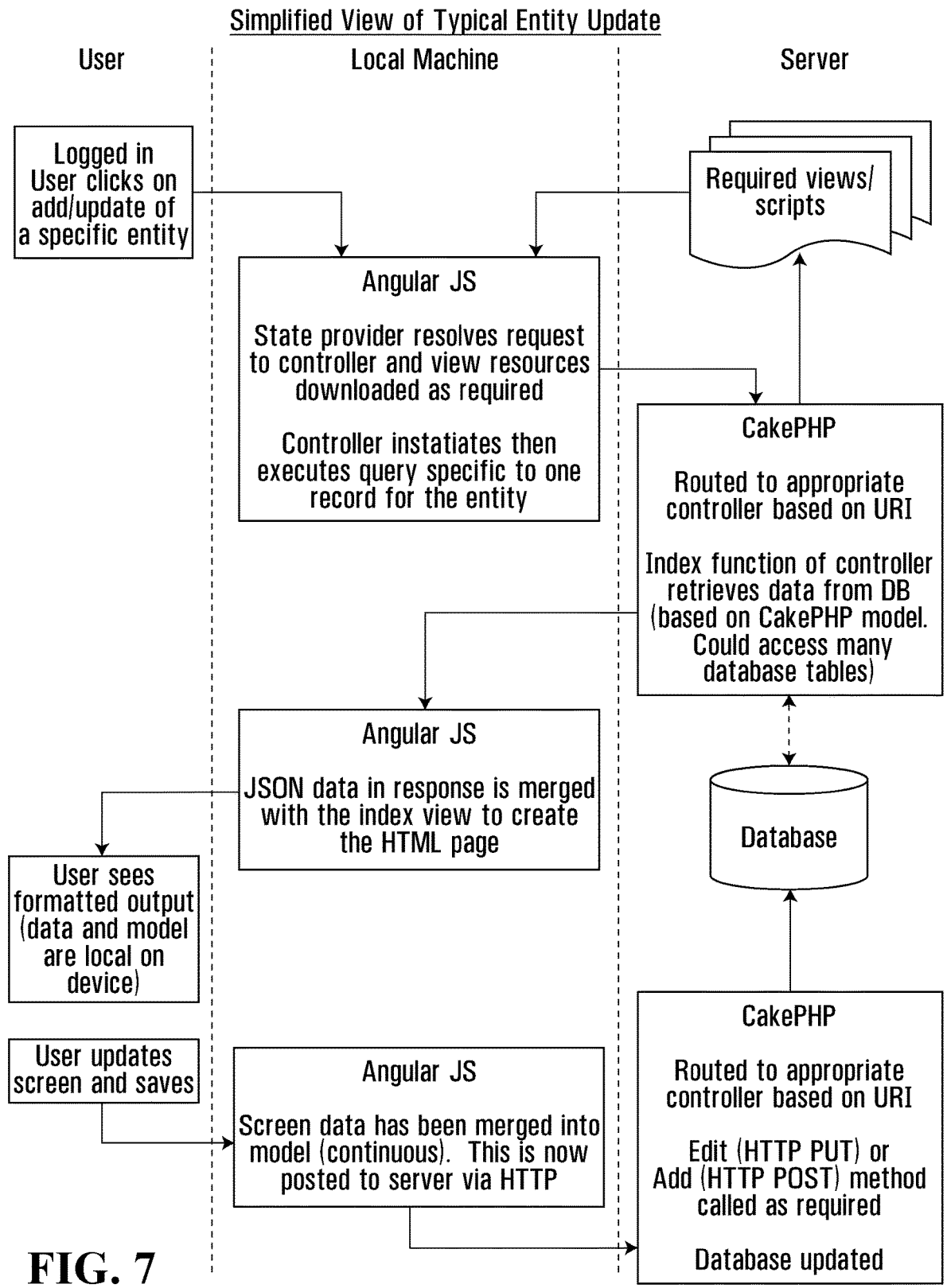
FIG. 7 illustrates a sequence of actions that occurs when a user requests the details of an entity and then saves the details into a record, in accordance with an embodiment of the disclosure.

FIG. 7 shows the sequence of actions that occurs when a user requests the details of an entity and then saves. Note that the view invoked by AngularJS will tend to be different as the user is only viewing a single entity rather than a set. For instance, the user may be looking at a specific piece of equipment and updating that equipment rather than viewing the whole set in a list.

In a specific, non-limiting example embodiment, the following software dependencies are included wherein various software components and plug-ins are used.

The software makes extensive use of open source software components and plug-ins. The back-end application has the following dependencies listed below. These may be managed via Composer™. The primary dependencies are PHP and Cake™ itself.

| Package | Purpose |
|---|---|
| CakePHP<br>Php<br>Cakephp<br>Mobiledetectlib<br>Migrations<br>Plugin-installer | CakePHP - Primary package |
| admad\CakePHP\cakephp-jwt-auth | A plugin for authenticating JSON Web tokens |
| motsmanish\cakephp-mailgun | Used for e-mail creation from the back-end. |

The front-end application uses the following plugins and packages. These are documented and managed with the Bower™ tool, for example.

| Package | Purpose |
|---|---|
| Angular<br>Angular-bootstrap<br>Angular-color-picker<br>Angular-file-upload<br>Angular-numeraljs<br>Angular-resource<br>Angular-sanitize<br>Angular-touch<br>Angular-ui-calendar<br>Angular-ui-router | AngularJS - Primary package<br><br><br><br><br><br><br><br><br>Routing performance and tracking |
| Bootstrap-sass-official | Primary CSS (Same as bootstrap-css) |
| Fullcalendar | Calendar control |
| Fullcalendar-scheduler | Associated scheduler for adding items |
| jQuery-ui | Useful widgets |

-continued

| Package | Purpose |
|---|---|
| ngSticky | Used to confine an element to the screen when a user is scrolling |
| textAngular | A text editor implemented in Angular |

Further aspects of the disclosure are set out below.

There may be provided a central controller device configured to facilitate shared use by a plurality of users of a commercial kitchen facility having one or more powered kitchen devices, the central controller device comprising:

a central communication interface configured for interoperation with one or more corresponding device communication interfaces adapted for controlling operation of the one or more powered kitchen devices;

a data storage configured to maintain one or more data structures storing device reservation data sets, operational data sets associated with operation of the one or more powered kitchen devices, and user profile data sets corresponding to each user of the plurality of users;

a device reservation management unit configured to receive one or more device reservation requests from the plurality of users and to automatically generate a device reservation schedule allocating time-based usage of the one or more powered kitchen devices among the plurality of users, the device reservation schedule stored on the data storage;

a user validation unit configured to receive user credentials at a time and to validate the user credentials against credentials of a corresponding user profile data set of one or more users of the plurality of users having a reservation proximate to the time on the device reservation schedule; and a device provisioning unit configured to, through the central communication interface and responsive to validated user credentials, transmit control signals to the one or more device communication interfaces, the control signals configured to modify a state of operation of the one or more powered kitchen devices.

The data storage may be further configured to capture time-encoded use data corresponding to the usage of the one or more facility devices by the one or more users, the time-encoded use data stored in the data storage.

The time-encoded use data may include both an operating state of each of the one or more powered kitchen devices, one or more usage characteristics of the one or more powered kitchen devices and one or more resource consumption characteristics of the one or more powered kitchen devices.

The central controller device may further comprise a device usage analytics unit configured to identify whether the one or more powered kitchen devices were used in accordance with the device reservation schedule, and to generate a report indicating utilization rates of the one or more powered kitchen devices compared against the device reservation schedule.

The device provisioning unit may be further configured, after a reservation concludes, to transmit a second set of control signals adapted to cause the de-provisioning of reserved one or more powered kitchen devices.

The device provisioning unit may include a dynamic price adjustment engine configured for automatically modifying prices based on at least one of reservation load, and expected demand.

The dynamic price adjustment engine may be configured for automatically modifying and re-allocating future reservations to modify distribution of reserved equipment between different shared equipment.

The central controller device may further include a sanitation tracking unit configured to track usage of cleaning equipment to estimate whether the powered kitchen devices were cleaned during each of the one or more device reservation requests.

The data storage may be further configured to maintain one or more data structures storing device cleaning data associated with operation of the one or more powered kitchen devices, the device cleaning data initially populated with manufacturer maintenance schedules and refined over a duration of time to provide an enhanced maintenance schedule based on data tracked from usage during the one or more device reservation requests.

The modification of the state of operation of the one or more powered kitchen devices may be provided through one or more controllable solenoids, each controllable solenoid associated with a corresponding powered kitchen device.

The one or more device communication interfaces may be configured to push firmware updates and modifications to the one or more powered kitchen devices or associated control interfaces at each of the one or more powered kitchen devices.

The one or more device communication interfaces may be further configured to push the device reservation schedule to each of the one or more powered kitchen devices.

The central controller device may further comprise one or more sensors associated with the one or more powered kitchen devices, the one or more sensors configured to track characteristics of use of the one or more powered kitchen devices.

A computer-implemented shared use facility may be provided, whereby a site controller device is configured for tracking and provisioning one or more available resources within a site. In some embodiments, the site controller may control multiple sites (e.g. a 1:n network of shared-use facilities), and is not limited to a single site, while in further embodiments site controllers may be coupled together such that a hierarchy of site controllers control one another (e.g. for particularly large installations, such as a global network of shared use facilities).

The site controller device may be configured to communicate, among others, signals that modify, coordinate, or control the operation of the shared resources at the site. The site controller device may control a shared kitchen or a series of shared sites, and control signals may be used to coordinate reservations, operational characteristics (on/off states, speed of operation, operating temperature), among others. The resources are not limited to kitchen equipment, but may also be directed to aspects such as human resource reservation (e.g. an on-call prep cook), space reservation (e.g. a prep station), among others. In some embodiments, specialized control hardware may be each associated with shared resources to add control features to otherwise "dumb" resources. For example, a connected, solenoid-enabled switch can be associated with a kitchen appliance such that aspects of the kitchen appliance (e.g. a stove) can be controlled. For some appliances, the control features are simply on/off features; on others, the control features are adapted to provide individually controllable features of various characteristics, such as temperatures, timers, individual burner on/off settings, among others.

In further embodiments, the system is configured for monitoring consumption and coordinating purchasing by the users at the various sites. Consumables can be tracked at the source of ingress, and one or more tags (e.g. cryptographic tags) may be associated with the usage or incorporation of the consumables into various end products. The tagging of consumables enables improved auditing mechanisms, which, for example, may be used to improve compliance tracking ensuring that products do not contain allergens, products abide by organic food requirements, among others.

While the disclosure has been described in connection with specific embodiments, it is to be understood that the disclosure is not limited to these embodiments, and that alterations, modifications, and variations of these embodiments may be carried out by the skilled person without departing from the scope of the disclosure. For example, it is contemplated that the electricity management system may be configured to control the energy demand of individual energy-demanding devices at the site, so as to better manage the energy demand curve. It is furthermore contemplated that any part of any aspect or embodiment discussed in this specification can be implemented or combined with any part of any other aspect or embodiment discussed in this specification.

The invention claimed is:

1. A system comprising:
a shared use facility comprising equipment for shared use by multiple users, the equipment for shared use comprising multiple pieces of equipment; and
a control system comprising a central control module and a plurality of equipment controllers associated with the multiple pieces of equipment and operable to control operating states of the multiple pieces of equipment associated therewith, the operating states comprising at least a first operating state in which an associated piece of equipment is disabled for use and a second operating state in which the associated piece of equipment is enabled for use, at least one of the equipment controllers being associated with multiple ones of the multiple pieces of equipment, and the control system configured to:
receive, at the central control module, an equipment reservation request from a user of the multiple users, wherein the equipment reservation request includes an indication of a selection, from among the multiple pieces of equipment, of at least one piece of equipment to be reserved for use by the user and a period of time that the selected at least one piece of equipment is to be reserved for use by the user;
update, by the central control module, an equipment reservation record based on the equipment reservation request, the equipment reservation record identifying when the selected at least one piece of equipment is reserved for use by the user;
receive, at the at least one of the equipment controllers, an equipment use request from the user, wherein the equipment use request includes an indication of a selection, from among the multiple pieces of equipment associated with the at least one of the equipment controllers, of one or more pieces of equipment to be used by the user, wherein the selected one or more pieces of equipment to be used by the user are comprised in the selected at least one piece of equipment reserved for use by the user;

in response to receiving the equipment use request, access by the central control module the equipment reservation record;

validate by the central control module the equipment use request based on the equipment reservation record and the equipment use request; and transmit, in response to validating the equipment use request, an activation instruction from the central control module to the at least one of the equipment controllers associated with the selected one or more pieces of equipment to be used by the user, for configuring the selected one or more pieces of equipment from the first operating state to the second operating state.

2. The system of claim 1, wherein each equipment controller of the plurality of equipment controllers is communicatively coupled to the central control module and each equipment controller is configured to control the operating states of one or more pieces of equipment associated therewith.

3. The system of claim 1, wherein validating the equipment use request comprises:

accessing a user profile record comprising user identifiers each associated with a respective one of the multiple users;

determining that a user identifier inputted by the user corresponds to the user identifier associated with the user in the user profile record; and determining that the selected one or more pieces of equipment:
are not reserved for use at a current point in time; or
are reserved for use by the user at the current point in time.

4. The system of claim 1, wherein the control system is further configured to modify an operating state of the selected one or more pieces of equipment by controlling one or more relays associated with the selected one or more pieces of equipment.

5. The system of claim 4, wherein the one or more relays comprise one or more solenoids.

6. The system of claim 1, wherein the control system is further configured to record equipment usage data during use of the equipment, wherein the equipment usage data comprises one or more of: energy consumption by the equipment during use of the equipment; and usage characteristics of the equipment.

7. The system of claim 1, wherein the control system is further configured to compare a duration of time during which the selected one or more pieces of equipment is in the first operating state to the period of time during which the selected at least one piece of equipment is reserved for use by the user, based on the equipment reservation record.

8. The system of claim 1, wherein the control system is further configured to:

determine, based on the equipment reservation record, that the equipment reservation request is no longer valid; and transmit, in response to determining that the equipment reservation request is no longer valid, a deactivation instruction for modifying an operating state of the selected one or more pieces of equipment desired for use from the second operating state to the first operating state.

9. The system of claim 1, wherein the control system is further configured to, prior to or in response to receiving the equipment use request, transmit an instruction to activate a camera for capturing an image of the user.

10. The system of claim 1, wherein the control system is further configured to:

prior to receiving the equipment use request, receiving login input from the user; and validate the login input.

11. The system of claim 1, wherein the control system is further configured to:

record a total amount of time that the equipment is in use; and in response to determining that the total amount of time is equal to a predetermined amount of time, transmit an alert for alerting a system administrator that maintenance of the equipment is required.

12. The system of claim 1, wherein the control system is further configured to:

determine that a contract with one of the multiple users has expired; and in response to determining that the contract has expired, update the equipment reservation record by removing any existing reservations made by the one of the multiple users whose contract has expired.

13. The system of claim 1, wherein the control system is further configured to transmit one or more firmware updates to the equipment or to the plurality of equipment controllers.

14. The system of claim 1, wherein the control system is further configured to receive sensor data from one or more sensors associated with the selected one or more pieces of equipment.

15. The system of claim 14, wherein the control system is further configured to transmit one or messages to a remote user device based on the sensor data.

16. The system of claim 15, wherein the one or more sensors comprise one or more temperature sensors.

17. The system of claim 1, further comprising one or more energy storage devices for providing energy to the plurality of equipment controllers.

18. The system of claim 1, further comprising one or more manual bypass switches for modifying an operating state of the selected one or more pieces of equipment from the first operating state to the second operating state.

19. The system of claim 1, wherein the control system is further configured to:

detect an opening of a door of one of the plurality of equipment controllers; and in response to detecting the opening of the door, activate a camera for capturing an image of a particular user of the one of the plurality of equipment controllers.

20. The system of claim 1, wherein the transmitting the activation instruction comprises transmitting the activation instruction so as to allow the user to use the selected one or more pieces of equipment before the period of time during which the selected one or more pieces of equipment are reserved for use by the user.

21. The system of claim 1, wherein the control system is further configured to allow the user to continue to use the selected one or more pieces of equipment after the period of time during which the selected one or more pieces of equipment are reserved for use by the user.

22. The system of claim 1, wherein the control system is further configured to, in response to transmitting the activation instruction, capture an image of the user.

23. The system of claim 1, wherein the control system is further configured to capture an image of a particular user tampering with the equipment for shared use.

24. A non-transitory computer-readable medium having computer program code stored thereon and configured when executed by a processor to cause the processor to perform a method comprising:
- receiving, at a central control module, an equipment reservation request from a user of multiple users, wherein the equipment reservation request includes an indication of a selection, from among multiple pieces of equipment, of at least one piece of equipment to be reserved for use by the user and a period of time that the selected at least one piece of equipment is to be reserved for use by the user;
- updating, at the central control module, an equipment reservation record based on the equipment reservation request, the equipment reservation record identifying when the selected at least one piece of equipment is reserved for use by the user;
- receiving, at at least one equipment controller associated with multiple ones of the multiple pieces of equipment, an equipment use request from the user, wherein the equipment use request includes an indication of a selection, from among the multiple pieces of equipment associated with the at least one of the equipment controllers, of one or more pieces of equipment to be used by the user, wherein the selected one or more pieces of equipment to be used by the user are comprised in the selected at least one piece of equipment reserved for use by the user;
- in response to receiving the equipment use request, accessing by the central control module the equipment reservation record;
- validating by the central control module, the equipment use request based on the equipment reservation record and the equipment use request; and
- transmitting, in response to validating the equipment use request, an activation instruction from the central control module to the at least one of the equipment controllers associated with the selected one or more pieces of equipment to be used by the user, for activating the selected one or more pieces of equipment by modifying an operating state thereof from a first operating state, in which the selected one or more pieces of equipment are disabled for use, to a second operating state, in which the selected one or more pieces of equipment are enabled for use.

25. A method of facilitating shared use by multiple users of one or more shared use facilities, each shared use facility comprising equipment for shared use by the multiple users, the equipment for shared use comprising multiple pieces of equipment associated with a plurality of equipment controllers, and at least one of the plurality of equipment controllers being associated with multiple ones of the multiple pieces of equipment, the method comprising:
- receiving, at a central control module of a control system, an equipment reservation request from a user of the multiple users, wherein the equipment reservation request includes an indication of a selection, from among the multiple pieces of equipment, of at least one piece of equipment to be reserved for use by the user and a period of time that the selected at least one piece of equipment is to be reserved for use by the user;
- updating by the central control module an equipment reservation record based on the equipment reservation request, the equipment reservation record identifying when the selected at least one piece of equipment is reserved for use by the user;
- receiving, at the at least one of the equipment controllers, an equipment use request from the user, wherein the equipment use request includes an indication of a selection, from among the multiple pieces of equipment associated with the at least one of the equipment controllers, of one or more pieces of equipment to be used by the user, wherein the selected one or more pieces of equipment to be used by the user are comprised in the selected at least one piece of equipment reserved for use by the user:
- in response to receiving the equipment use request, accessing by the central control module the equipment reservation record;
- validating by the central control module the equipment use request based on the equipment reservation record and the equipment use request;
- transmitting, in response to validating the equipment use request, an activation instruction from the central control module to the at least one of the equipment controllers associated with the selected one or more pieces of equipment to be used by the user, tor activating, the selected one or more pieces of equipment; and
- in response to receiving the activation instruction at the at least one of the equipment controllers associated with the selected one or more pieces of equipment to be used by the user, activating the selected one or more pieces of equipment by modifying with the at least one of the equipment controllers an operating state of the selected one or more pieces of equipment from a first operating state, in which the selected one or more pieces of equipment are disabled for use, to a second operating state, in which the selected one or more pieces of equipment are enabled for use.

* * * * *